April 30, 1963 B. C. ALLEN ETAL 3,087,807
METHOD OF MAKING FOAMED METAL
Filed Dec. 4, 1959
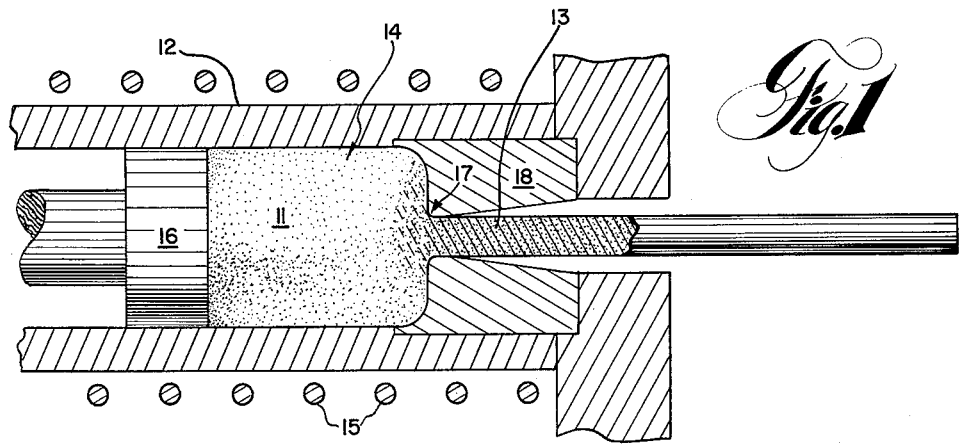
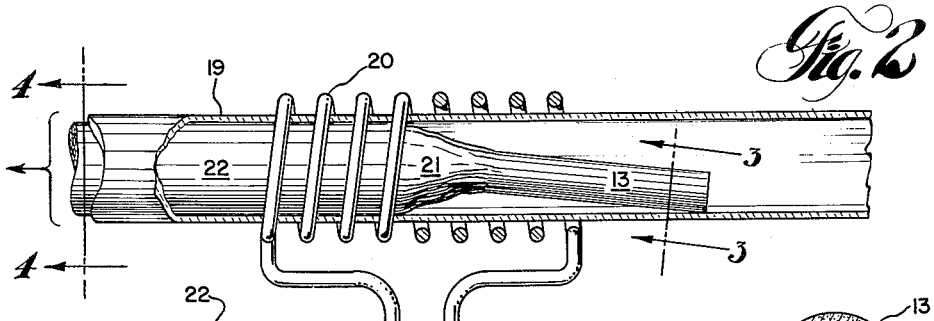
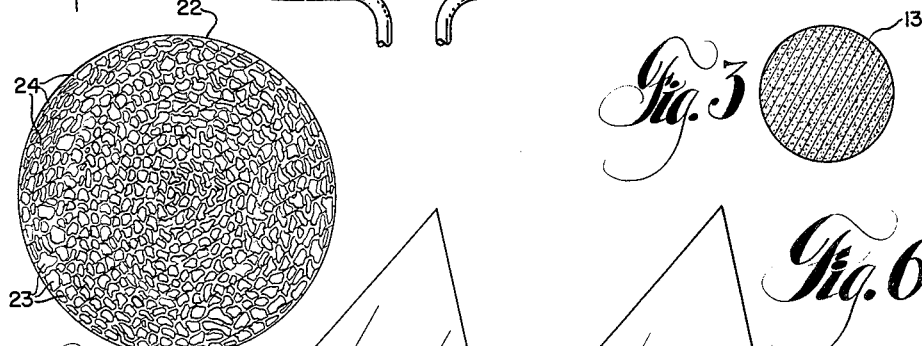
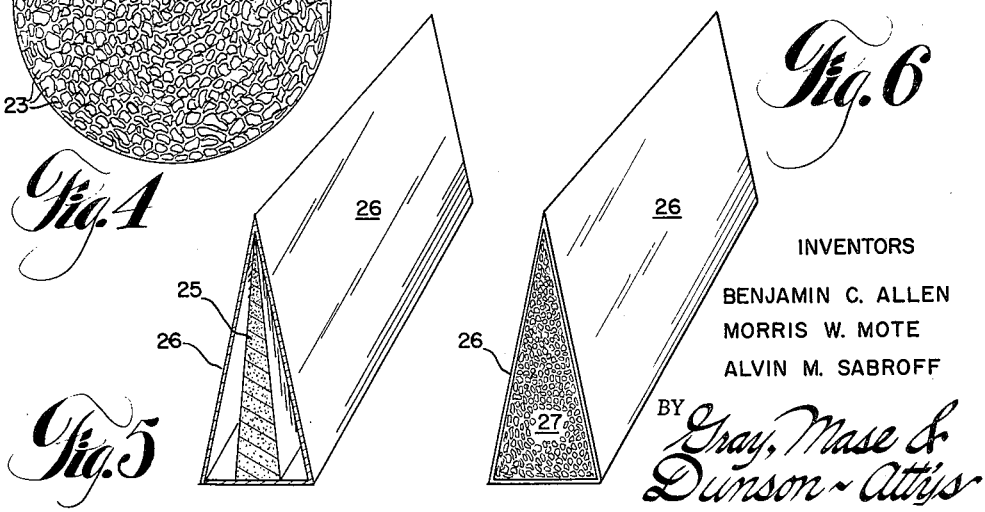
INVENTORS
BENJAMIN C. ALLEN
MORRIS W. MOTE
ALVIN M. SABROFF
BY Gray, Mase &
Dunson Attys United States Patent Office 3,087,807
Patented Apr. 30, 1963

3,087,807
METHOD OF MAKING FOAMED METAL
Benjamin C. Allen, Columbus, Ohio, Morris W. Mote, Pleasanton, Calif., and Alvin M. Sabroff, Columbus, Ohio, assignors, by mesne assignments, to United Aircraft Corporation, East Hartford, Conn., a corporation of Delaware
Filed Dec. 4, 1959, Ser. No. 857,429
2 Claims. (Cl. 75—20)

This invention relates to foamed-metal structures and methods of making such structures. More particularly, it relates to methods of making foamed-metal structures wherein a gas-forming material is embedded in a metal matrix, and the matrix is thereafter heated and gas is released to provide foam.

Current high-temperature design, especially in the air frame and missile field, now uses primarily two types of porous structures: (1) honeycomb sandwich construction; and (2) foamed-plastic filling in hollow-metal structures. Extremely light, stiff structural members can be developed around these materials. However, both honeycomb sandwich and foamed-plastic-filled structures have serious limitations. Honeycomb construction is expensive and difficult to form into complicated shapes. Currently available organic foams are limited to applications below 400° F., and it seems unlikely that the range will be extended appreciably in the future. Projected designs for future aircraft and other applications anticipate much higher temperatures, probably throughout the structure.

A primary object of the present invention is to provide a structure having bulk density the same as, or lower than, commercial honeycomb but with greater rigidity and strength and having a broader range of use. Another object is to provide a porous structural material for use in aircraft-engine, air-frame, and missile construction as well as in the building and transportation industries. Yet another object is to provide improved steps, starting materials, and methods for making porous structures which have significant advantages over the prior art.

According to the present invention, a powdered structural metallic material (a metal or an alloy) is thoroughly mixed with a powdered gas-forming material. It is highly preferred that this material should release a substantial amount of gas at about the melting temperature of the powdered metal. This mixture is then extruded, preferably after being cold compacted, under sufficient heat and pressure to consolidate the metal of the mixture and leave the resulting gas-forming material embedded in the resulting metal matrix. The resulting extruded material is then heated in a controlled manner, preferably to at least the melting point of the structural metal material, so as to produce a foam. Upon cooling, this foam provides a lightweight porous structural material.

The ramifications and scope of the present invention will be clear from the following description.

In the drawings:

FIG. 1 is a view in cross section through an extrusion press illustrating the extrusion step of the present invention;

FIG. 2 is a view in cross section through an induction heating unit illustrating the foaming step of the present invention;

FIG. 3 is a sectional view taken in the plane 3—3 of FIG. 2, of an unfoamed extruded bar according to the present invention;

FIG. 4 is a sectional view taken in the plane 4—4 of FIG. 2, of the bar of FIG. 3 after it has been expanded;

FIG. 5 is a view in cross section of an unfoamed extruded insert lying within a hollow structural form; and FIG. 6 is a similar view showing the form of FIG. 5 after the insert has been expanded.

According to a preferred embodiment of the present invention and with reference to FIG. 1, a mixture 11 of powder is extruded in an extrusion press 12. The powdered mixture 11 consists of a powdered structural metal, for instance aluminum, and a powdered material, substantially uniformly dispersed therein, which releases gases at about the melting temperature of the structural metal. Most of the powder 11 is powdered metal, say at least about 90 weight percent of it. In the extrusion step illustrated by FIG. 1, the extrusion of the powdered mixture 11 serves to consolidate the metal powders in the extruded material 13. This consolidation forms a metal matrix in which are embedded particles of the gas-forming material. The extrusion ratio and temperature of extrusion must be at least high enough so that this consolidation takes place.

The powdered mixture 11 is pre-heated and then placed in the cavity 14 of the pre-heated extrusion press 12. To preheat the extrusion press 12, current is passed through the coils 15 surrounding the cavity 14. Heating may be resistance heating or by induction. At extrusion, the mixture 11 should be at a suitable extrusion temperature, say 900° F. for aluminum powder. The plunger 16 is pushed to extrude the mixture 11 through the die opening 17 in the die 18, forming the extruded material 13.

It has been found that the powdered structural metals of the present invention often contain an outer oxide film. This oxide film must be broken up before good consolidation of the powder may take place. The rapid mixing and upsetting action provided by the extrusion process has been found to consistently break up the oxide films sufficiently to give good consolidation. Mere compacting of the powders, even under high pressures, has not provided the good consolidation necessary to the present invention.

Alternatively to placing the powdered mixture 11 in cavity 14 in the above steps in the form of uncompacted powders, however, excellent results may be obtained by first compacting the mixture 11 to form a unitary mass. Then this mass may be extruded to consolidate it as the extruded material 13.

The extruded material 13, say in the form of a bar, is then heated as illustrated by FIG. 2. Induction heating is the preferred method. A container or structural form 19 having within it the extruded bar 13 is fed through the induction coil 20 (or, of course, the coil may be moved across the bar). As the bar 13 is fed through the heating zone of the induction coil 15, melting of the metal matrix accompanied by release of gas by the gas-forming particles takes place forming a foam 21 which expands to the inner confines of the form 19. After the foamed material 21 has passed through the induction coil 20, cooling takes place rapidly, forming a porous metal structure 22.

The zone foaming method described above has many advantages and is highly preferred. In the first place, induction heating permits a wide range of high heating rates which is an important requirement of the method of this invention. Secondly, induction heating permits high cooling rates, also important to this invention. And, perhaps most importantly, the zone heating and foaming method provides, immediately adjacent to the entire cross section of the material being heated 21, an already cooled cross-section of material 22. This results in high heat-transfer rates perpendicular to the cross-section of the heated zone of material (i.e. perpendicular to section 4—4), even at the center of the section. In other words, the mass of material at temperature is small and will cool rapidly by conduction of heat to the rest of the material. In this way, the foam is generated continuously along the length of the material and preserved. With uniform heating rather than zone heating, cooling must proceed from the surfaces of the material and the center of the foamed material is thus cooled relatively slowly. Rapid cooling, however, is preferred throughout the foamed material since uniform pore size cannot be obtained without rapid stabilization of the foam. Thus, in a uniform heating process, the pores which are centrally located will remain hot and unstabilized longer and will coalesce, and a large central pore size will result. The only areas of uniform small pore size will be at the outside of the material. For an optimum strength-weight ratio for the foamed material, uniform pore size throughout the material is very important.

FIGS. 3 and 4 illustrate, respectively, the extruded bar 13 before and the resulting foamed material 22 after the foaming step. The foamed material as illustrated in FIG. 4 includes many pockets or voids 23 within a metal matrix 24.

FIG. 5 illustrates, in cross-section, an extruded material 25 resting within a hollow structural form 26. When the extruded material 25 is heated above the melting temperature of the metal therein, rapid foaming takes place until the foamed extruded material 27 completely fills the structure 26, is illustrated in FIG. 6.

Aluminum is preferred as the powdered metal of the present invention. Zirconium hydride and calcium carbonate are preferred as the gas-forming powders.

In addition to aluminum, other structural metals which, although not preferred, may be used include but are not limited to iron-base alloys (such as those known as "302 Stainless" and "AM 355 Stainless"), nickel-base alloys, copper-base alloys, and magnesium-base alloys.

In practicing the process of the present invention with aluminum as the powdered metal, the aluminum and gas-forming powders are mixed by shaking and tumbling for one-half hour. The powders are then cold-compacted at five tons per square inch to facilitate future handling, as well as to provide oxidation protection for the aluminum during heating. Induction melting the cold compacts produces no foam, as all the gas merely escapes. However, if the compacts are hot-extruded, then foams may be obtained because extrusion consolidates the aluminum matrix. The gross deformations occurring during extrusion break up the oxide film on the aluminum powders, allowing consolidation.

Also, using zone-melting techniques as hereinbefore described, a long bar of the extruded mixture may be progressively foamed by passing it along the induction-coil axis.

For example, an extruded bar of aluminum powder 16 inches in length and 3/8 inch in diameter containing 2 percent $CaCO_3$ dispersed therein may be zone-foamed as follows: The extruded rod is placed inside a horizontal Vycor glass tube 21 mm. in inside diameter; the coil through which the tube is pushed is 2¼ inches in inside diameter, eight inches long, and has 24 turns of ¼-inch copper tubing; the power through the coil is five kilowatts. As the tube containing the extruded rod is slowly pushed through the coil, observations are made and the speed with which the rod-containing tube is pushed through the coil is set so that foaming of a cross-section of the rod occurs just to the confines of the tube as the cross-section reaches the end of the coil and begins to cool. In the above example, this occurs when the tube is pushed through the coil at the rate of about 1½ feet per minute. The resulting bulk density is 0.45 gram per cubic centimeter.

In an example identical to that described above, except that the extruded rod contains ½ percent zirconium hydride rather than 2 percent $CaCO_3$, the tube is also pushed through the coil at the rate of about 1½ feet per minute. The resulting bulk density is 0.55 gram per cubic centimeter. In both the above examples, pores are evenly distributed and uniform in size.

Uniform metal foams are very difficult to produce by mixing gas-forming agents into an aluminum melt, in a manner such as described by U.S. Patent No. 2,751,289. The basic difficulties with the aluminum foams produced are: (1) there results nonuniform distribution of pores caused by inadequate mixing of the metal and gas former; (2) the rates of heating and cooling are difficult to control; and (3) the foams are not readily applicable to molding and shaping. The foaming method of the present invention overcomes the above three difficulties.

In particular, the problem of mixing is partially overcome by blending of fine gas-former and metal powders. The powder aggregate is further mixed by hot coextrusion. This mixing process does not require wetting of the gas-former particles by the molten metal to achieve dispersion.

Since aluminum foams tend to be rather unstable, a rapid heating and foaming process followed by rapid cooling process to preserve the foam are necessary. Induction heating provides this rapidity. It is well known that a variety of heating rates are available through the use of induction. If the metal heats itself, as may be done in an induction heating process, rapid cooling is possible because the heat source can be turned off immediately after foaming. Small pieces cool rapidly in surroundings such as open air molds. Water cooling can be applied to larger pieces. Additionally, in a zone-foaming process, as hereinbefore mentioned, only part of the piece being foamed is heated at any given time and the unheated part of the piece adjacent the heated part provides high heat-transfer rates from the heated part.

The induction-foaming procedure is readily adaptable to many kinds of molding. Shapes with sharp corners may be induction-foamed in place. Also long cylinders are readily made from an extruded aggregate using zone-foaming techniques. Among other useful applications are production of lightweight plate stock or other structural members such as I beams, or use as a replacement for foamed plastics in control surfaces.

A thin metal container may be used in place of a nonmetalic mold to contain the foam. Slotted thin wall cylinders do not heat well at low frequencies and are therefore, for example, used as radiation shields. Thus, the combination of a rod of sufficient susceptibility and a thin slotted metal tube is ideal. The solid rod is melted and foamed to the inside diameter of the metal container, welding the foam to the container—all in one operation. Examples of useful materials are aluminum in a thin aluminum tube, a carbon steel tube, or a stainless steel tube, or foamed steel in a steel tube.

Following is a further example of the present invention.

Aluminum powder with a particle size of −150 mesh is mixed with zirconium hydride ($ZrH_{1.81}$) with a particle size of −200 mesh. The proportions mixed are 99 weight percent aluminum and 1 percent zirconium hydride. The aluminum and gas-former powders are mixed by shaking and tumbling for one-half hour and are then cold-compacted at 5 tons per square inch. A 60-gram compact of the mixed powders is extruded at 900° F. using an extrusion ratio of 8 to 1 and an exit speed of the extruded rod of 10 inches per minute. The extruded sample is in the form of a rod three-eighths inch in diameter.

The extruded rod is placed inside a horizontal Vycor glass tube coaxial with an induction coil. The inside diameter of the glass tube is seven-eighths inch. Graphite is sprayed onto the rod before the rod is placed inside the tube to prevent the rod from sticking to the glass. The induction unit used is a 440-volt, 80-kw. motor-generator unit, operating at 9.6 kc. using a one-quarter-inch-diameter copper coil, the coil being two and one-quarter inches in internal diameter, 8 inches long, and having twenty-four turns. The current in the induction coil is turned on and the extruded rod is allowed to foam to the inside diameter of the Vycor tube. The power is then turned off. This requires approximately 22 seconds' heating time and the approximate heating rate is about 59 Fahrenheit degrees per second. Thereafter the foamed sample is immediately allowed to cool in air. As a result of the above procedure, a porous aluminum rod seven-eighths inch in diameter is obtained, with a bulk density of 0.58 gram per cubic centimeter.

In many experiments which were conducted, similar to the examples described above, it was found that induction heating at 10 kc. results in foams of lower bulk density than does induction heating at 150 kc. Uniform heating is obtained when the samples are heated at 10 kc., whereas, when the samples are heated at 150 kc., the edges foam prematurely and collapse somewhat. More even heating is obtained using low frequencies. Using high frequencies, the skin is heated first. Pore size and distribution, however, appear to be the same for the two frequencies. Extrusion temperatures down to 750° F. may be used successfully but extrusion at about 900° F. provides slightly smaller pore sizes because of better consolidation of the matrix. Visual observation and temperature-indicating paint show the specimen temperature to be linear with heating time until foaming starts, at which point the heating rate appears to rise because of the additional cross-sectional area. Heating rates between 20 and 130 degrees per second (Fahrenheit) have no significant effect on the bulk density of foamed aluminum. At the lower rates, there is a chance for the gas to escape prematurally as shown by poor results achieved with an aggregate heated at 5 degrees per second Fahrenheit. Heating rates appear to have no effect on pore size or distribution.

Heating time at a given power setting is very critical although simple experimentation readily yields optimum times for various configurations. Differences of two seconds from the optimum time result in a useless under-foamed or overfoamed product with zirconium hydride as the gas former. Aluminum foamed with titanium hydride is more sensitive, while aluminum foamed with calcium carbonate is less sensitive to this heating time.

The type of gas former used is also critical. With aluminum, for example, excessive thermal stability of the gas former at 1600° F., 400 degrees above the melting point of aluminum, prevents such gas formers as calcium hydride from being usable foaming agents for aluminum since insufficient gas pressure is available at the foaming temperature. Excessive thermal instability at 600° F., 600 degrees below the melting point of aluminum, prevents such gas formers as magnesium hydride and lithium aluminum hydride from being usable foaming agents for aluminum since, for one thing, the gas is released during hot extrusion. Some powders such as zinc sulfate and aluminum sulfate appear to be corrosive to the aluminum matrix and in some cases the foam disintegrates. These unfavorable results are probably caused by combination of $SO_3$ and water to form sulfuric acid, which attacks aluminum. Use of calcium carbonate, zirconium hydride, and titanium hydride as foaming agents results in suitable foams having bulk densities between 0.45 and 0.55 gram per cubic centimeter.

Foamed aluminum expanded with zirconium hydride, titanium hydride, and calcium carbonate has pores which are open or interconnected. This is hardly surprising because, on cooling, the gas in each void or pore contracts and breaks a hole in the pore wall to equalize pressure with the surrounding atmosphere.

Gas-former concentrations above a certain amount do not lower the bulk density of the foamed aluminum appreciably, but substantially smaller amounts do result in a higher bulk density. This amount appears to be about 0.5 weight percent zirconium hydride, 0.4 weight percent titanium hydride, and 2 weight percent calcium carbonate. These respective amounts of gas former give bulk densities in th range of 0.4 to 0.6 gram per cubic centimeter compared to 2.7 gram per cubic centimeter for aluminum.

At least 99 weight percent aluminum is preferred when zirconium hydride is used as the gas former. With calcium carbonate, at least 90 weight percent aluminum is preferred. And with titanium hydride, at least 99 weight percent aluminum is preferred.

Bulk density of the foamed aggregate as well as pore size and pore distribution were considered in evaluating the foamed aggregates of the present invention. Gas-former particle size has no significant effect on aluminum-foam bulk density. The pore size distribution is essentially the same for different sizes.

It will be understood, of course, that while the forms of the invention herein shown and described constitute the typical or preferred embodiments of the invention, it is not intended herein to illustrate all of the possible equivalent forms or ramifications of this invention. It will also be understood that the words used are words of description rather than of limitation and that various changes may be made without departing from the spirit or scope of the invention herein disclosed.

What is claimed is:

1. A method of making a lightweight, porous metallic structure comprising the steps of: compacting at a pressure of at least about 5 tons per square inch a mixture containing at least about 90 weight percent of aluminum powder and a powdered material which releases a substantial amount of gas at about the melting temperature of aluminum and which is a member selected from the group consisting of calcium carbonate, zirconium hydride and titanium hydride; extruding the resulting compact at an extrusion ratio of at least 8:1 and at a temperature of at least about 750° F. but below the melting point of aluminum to form an extruded rod of aluminum and the powdered material; progressively heating the resulting extruded rod at a heating rate of from about 20 to about 130 Fahrenheit degrees per second to at least about the melting temperature of aluminum to produce a foam; and rapidly cooling the resulting foamed material to form a lightweight porous structure of a uniform pore size and having a bulk density of about 0.45 to 0.58 gram per cc.

2. A method of making a lightweight, porous metallic structure comprising the steps of: compacting at a pressure of at least about 5 tons per sq. in. a mixture containing at least about 90 weight percent of a powdered structural metallic material and a powdered material which releases a substantial amount of gas at about the melting temperature of the structural metallic material and which is a member selected from the group consisting of calcium carbonate, zirconium hydride and titanium hydride; extruding the resulting compact at an extrusion ratio of at least 8:1 and at a temperature of at least about 750° F. but below the melting point of the structural metallic material to form an extruded rod of the structural metallic material and the powdered material; progressively heating the resulting extruded rod at a heating rate of from about 20 to about 130 Fahrenheit degrees per second to at least about the melting temperature of the structural metallic material to produce a foam; and rapidly cooling the resulting foamed material to form a lightweight porous structure of a uniform pore size having a bulk density of about 0.45 to 0.55 gram per cc.

References Cited in the file of this patent

UNITED STATES PATENTS

| | | |
|---|---|---|
| 1,633,258 | Laise | June 21, 1927 |
| 1,642,348 | Williams | Sept. 13, 1927 |
| 2,434,775 | Sosnick | Jan. 20, 1948 |
| 2,553,016 | Sosnick | May 15, 1951 |
| 2,751,289 | Elliott | June 19, 1956 |
| 2,935,396 | Pashak | May 3, 1960 |
| 2,937,938 | Fiedler et al. | May 24, 1960 |

FOREIGN PATENTS

| | | |
|---|---|---|
| 615,147 | France | Dec. 30, 1926 |
| 811,814 | Great Britain | Apr. 15, 1959 |